United States Patent von Kaler et al.

[11] Patent Number: 4,966,574
[45] Date of Patent: Oct. 30, 1990

[54] TRANSAXLE

[75] Inventors: Roland L. von Kaler; Rocky H. Page, both of Tecumseh, Mich.

[73] Assignee: Tecumseh Products Company, Tecumseh, Mich.

[21] Appl. No.: 362,343

[22] Filed: Jun. 6, 1989

[51] Int. Cl.⁵ ............................................. F16H 37/08
[52] U.S. Cl. .................................... 475/206; 475/207; 74/371
[58] Field of Search ................. 74/371, 372, 700, 701, 74/606 R; 384/434; 475/202, 302, 206, 207

[56] References Cited

U.S. PATENT DOCUMENTS

| | | | |
|---|---|---|---|
| Re. 32,125 | 4/1986 | von Kaler et al. | 74/371 |
| 1,035,040 | 8/1912 | Paulson | 74/371 |
| 1,740,725 | 12/1929 | Brown | 74/371 |
| 3,485,329 | 12/1969 | Hauser | 192/4 R |
| 4,103,566 | 8/1978 | von Kaler et al. | 74/371 |
| 4,232,569 | 11/1980 | Hauser et al. | 74/701 |
| 4,449,424 | 5/1984 | Hauser | 74/701 |
| 4,633,979 | 1/1987 | Edwards | 188/72.1 |
| 4,656,886 | 4/1987 | Edwards | 74/475 |
| 4,662,241 | 5/1987 | Edwards | 74/701 |
| 4,673,055 | 6/1987 | Yamaoka et al. | 180/336 |
| 4,702,119 | 10/1987 | Edwards | 74/372 X |
| 4,702,120 | 10/1987 | Okada et al. | 74/371 |
| 4,713,983 | 12/1987 | Rundle | 74/701 |
| 4,771,636 | 9/1988 | Fujita | 74/371 |
| 4,779,475 | 10/1988 | Irikura et al. | 74/371 |
| 4,827,783 | 5/1989 | Yamaoka et al. | 74/371 |

Primary Examiner—Leslie A. Braun
Assistant Examiner—Khui Q. Ta
Attorney, Agent, or Firm—Jeffers, Hoffman & Niewyk

[57] ABSTRACT

A transaxle having five forward speeds and reverse includes a shift shaft on which are journalled for free rotation four forward speed change gears and an input bevel gears which is integrally conjoined with a first speed change gear. A reverse gear is also journalled for free rotation on the shift shaft and a neutral spacer is disposed between reverse gear and the four forward gears. A counter shaft carries five companion spur gears in constant running mesh with the forward speed change gears. One of the companion gears is also in constant running mesh with a reverse intermediate gear which is in constant running mesh with the reverse gear. The reverse intermediate gear is supported by a half-bearing in the transaxle housing. A pair of axially slidable and radially outward biased shift keys on the shift shaft selectively couple the forward speed change gears, the input bevel gear, and the reverse gear to the shift shaft. High gear is provided by coupling the bevel gear directly to the shift shaft and bypassing the counter shaft. A differential driven by a spur gear on the shift shaft drives the output drive shafts of the transaxle. A disc brake is provided on the shift shaft.

16 Claims, 3 Drawing Sheets

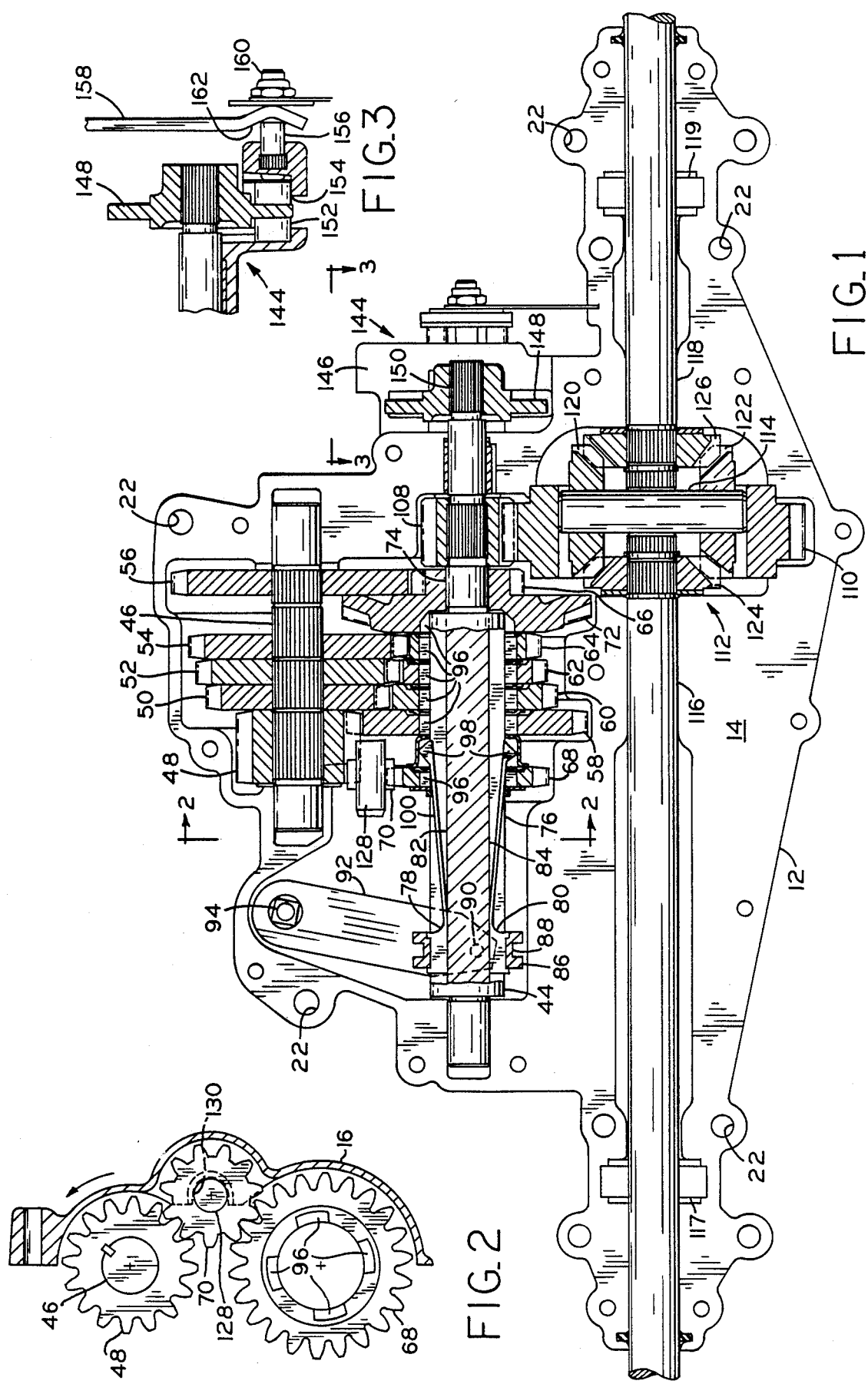

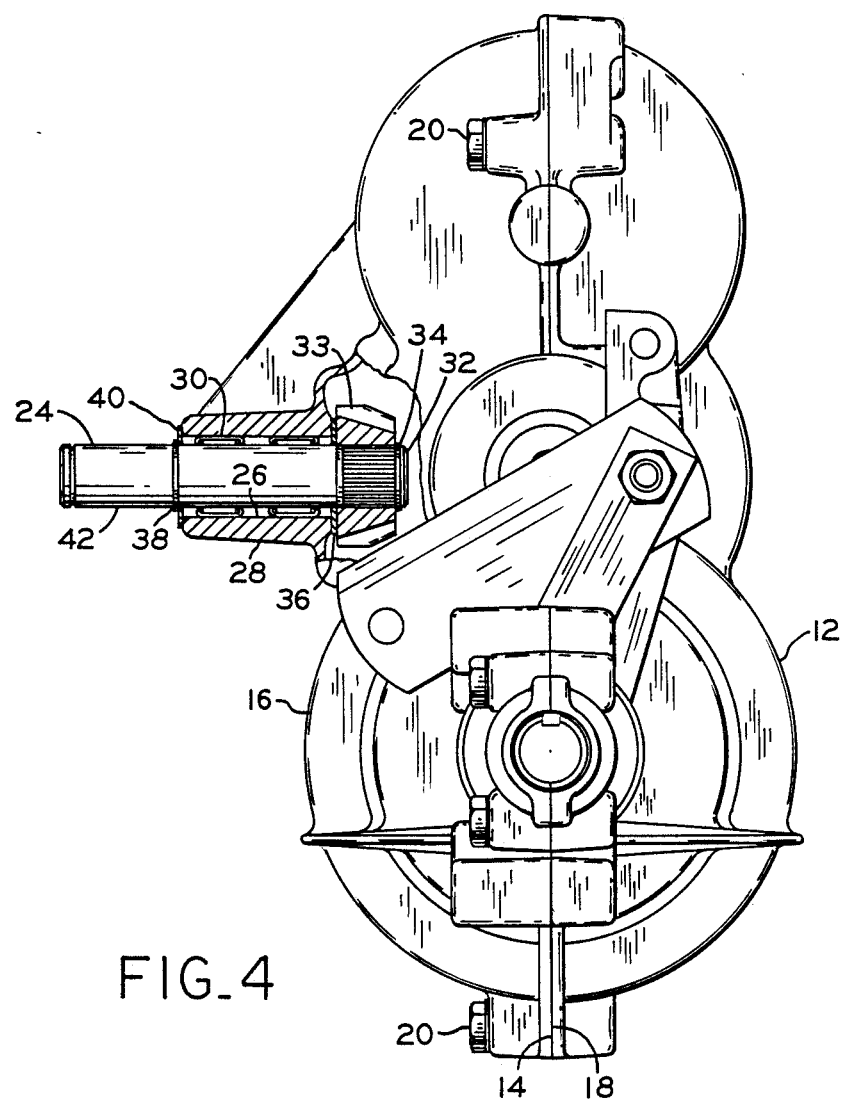
FIG_4
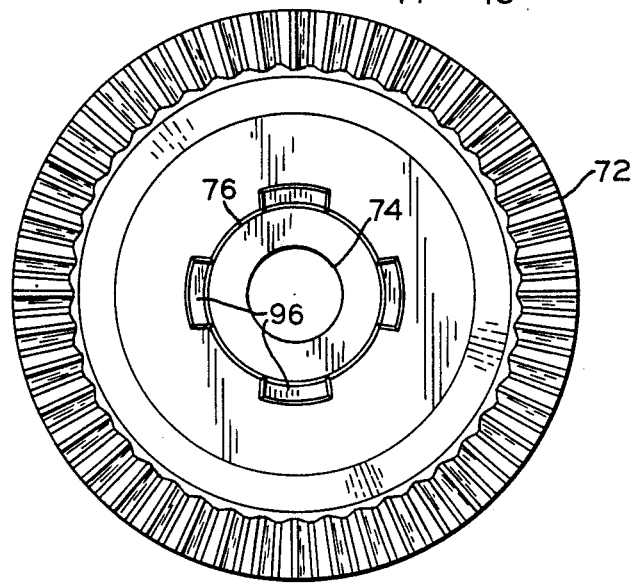
FIG_8

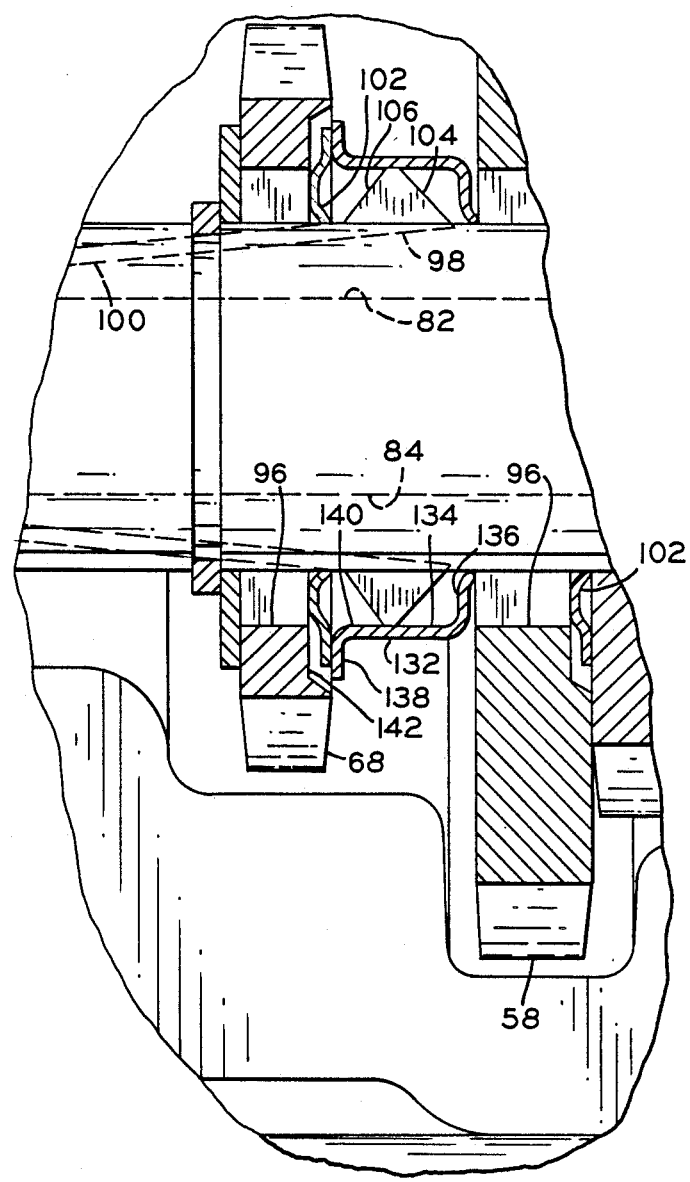
FIG_7
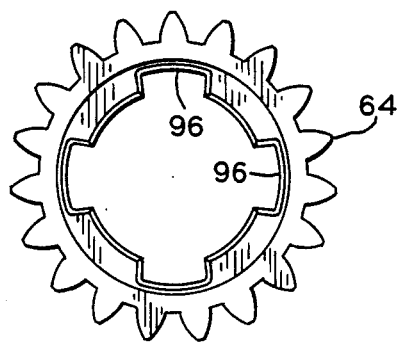
FIG_5
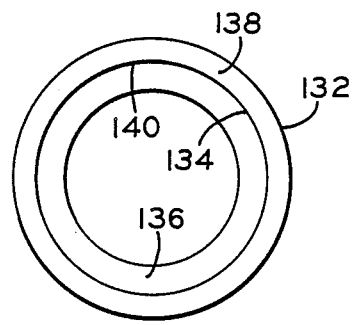
FIG_6

TRANSAXLE

BACKGROUND OF THE INVENTION

The present invention relates generally to manually shifted transaxles of the type used in combination with small air cooled engines in vehicles such as garden tractors and ride-on mowers, and more particularly to such a transaxle having an in-line-shift speed change transmission.

Manually shifted transaxles of the type concerned herein often employ a main shaft carrying a plurality of freely journalled speed change gears which can be selectively coupled to the main shaft by a shift mechanism. Each of the speed change gears is in constant running mesh with one of a plurality of companion gears affixed to a counter shaft which rotate together in unison. Power input to the transaxle is via a bevel pinion gear engaged with a bevel gear affixed to the counter shaft. Power output from the main shaft to the output drive shafts is via a differential. One such transaxle arrangement is shown in U.S. Pat. No. 4,673,055.

One variation of the above-described configuration is shown in U.S. Pat. No. 4,662,241, in which the bevel gear is freely journalled on the main shaft and has a spur gear integrally formed with the bevel gear. The integral spur gear is in constant running mesh with one of the companion gears so that power can be transmitted from the bevel gear to the counter shaft. Speed selection is accomplished by an axially shiftable spring shift key on the main shaft which selectively engages radial keyways in the speed change gears to couple the selected gear to the main shaft. One of the gear pairs on the main shaft and the counter shaft can be eliminated by providing radial keyways in the bevel gear so that the bevel gear can be coupled directly to the main shaft without transmitting power through the counter shaft.

As illustrated in U.S. Pat. No. 4,662,241, the main shaft on which the bevel gear and speed change gears are journalled is of a relatively large diameter. This allows the shift keys to engage the keyways of the gears at a radial distance sufficiently removed from the axis of the main shaft to avoid excessive shear forces on the shift keys and keyways. However, this relatively large diameter sets a lower limit to the diameter of the speed change gears which are journalled on the main shaft, thereby limiting the overall speed change ratio which can be accomplished with the transmission. The present invention overcomes the aforementioned limitation and permits a wider range of ratios in the transaxle.

It is relatively common to employ a chain drive between the reverse gear on the main shaft and its corresponding gear on the counter shaft to effect reversal of drive direction. The use of such chains make it relatively more difficult to assemble the transaxle than if the transmission gearing were strictly composed of spur gears. Chain drives also generate more noise and are subject to greater wear. An alternative is to employ a third spur gear between the reverse gear and its companion gear on the counter shaft which is in constant running mesh with both gears. This, however, requires a third stub shaft to support only the intermediate reversing gear. The stub shaft requires some sort of bearing support in the transaxle housing which generally would not be in the same plane as the main and counter shafts. Consequently, the technique of providing a transaxle housing split along the plane in which the main and counter shafts lie in order to simplify assembly of the intermeshed gears into the housing would not appear to be available to simplify the mounting of the intermediate reverse gear stub shaft. A further assembly step of mounting the stub shaft in its own bearing would appear to be necessary. The present invention overcomes the apparent difficulty discussed above.

SUMMARY OF THE INVENTION

The present invention in one aspect according to an embodiment thereof involves a manually shifted transaxle in which the speed change spur gears and an input bevel gear having an integral speed change spur gear are freely journalled on the main shaft, or shift shaft, of the transaxle. Shift means are provided to selectively couple the speed change spur gears and the bevel gear to the shift shaft. In order to provide a wider overall range of speed ratios, the shift shaft is constructed in two portions having different diameters, and the free speed change gears and the bevel gear are journalled on the larger diameter portion, whereas the spur gear integral with the bevel gear is disposed beyond the diameter transition and is journalled on the smaller diameter portion of the shift shaft. A coupling means between the shift shaft and the gears journalled thereon acts only along the larger diameter portion and therefore consumes none of the radially innermost portion of the integral spur gear. Consequently, the outer diameter of the integral spur gear can be made smaller than would otherwise be possible, which allows a greater transmission ratio range.

In another aspect of the present invention according to an embodiment thereof, reverse gear is provided by a reverse intermediate gear in constant running mesh with a reverse gear on the main shaft and a companion gear on the counter shaft. To ease assembly of the transaxle, the reverse intermediate gear is supported on a stub shaft which is carried in a half-bearing pocket in the housing of the transaxle. The half-bearing pocket opens in a direction toward a line extending through the axes of rotation of the reverse gear on the shift shaft and its companion gear on the counter shaft.

In accordance with a further aspect of the present invention, a neutral spacer disposed between first and reverse gears on the shift shaft defines in part an annular groove into which is received the shift key to provide a neutral gear condition. The neutral spacer is constructed of stamped sheet metal at reduced cost compared to cast and machined spacers.

According to a preferred embodiment, the present invention includes a transaxle having a housing and a shift shaft rotatably mounted in the housing, the shift shaft having a first portion and a second portion wherein the first portion is of greater diameter than the second portion, the shift shaft having an output spur gear affixed to and rotatable with the shift shaft. A plurality of adjacent speed change spur gears are journalled for free rotation on the first portion of the shift shaft. A bevel gear is integrally conjoined with a speed change spur gear. The bevel gear is journalled for free rotation at least in part on the first portion of the shift shaft and the integrally conjoined speed change gear is journalled for free rotation on the second portion of the shift shaft, such that the bevel gear is disposed axially intermediate the integrally conjoined speed change gear and the plurality of adjacent speed change spur gears. Shift means rotatable with the shift shaft and axially movable on the first portion of the shift shaft are provided for selectively coupling each of the plurality of speed change spur gears and the bevel gear one at a time to the shift shaft to effect rotation in unison therewith. A counter shaft is rotatably mounted in the housing parallel to the shift shaft, and a plurality of companion spur gears are affixed to and rotatable in unison with the counter shaft, each of the companion spur gears being in constant running mesh with at least one of the plurality of adjacent speed change gears and the integrally conjoined speed change gear. A differential gear assembly is mounted in the housing and is in constant running mesh with the output spur gear of the shift shaft. A pair of output drive shafts are rotatably mounted in the housing and driven by the differential gear assembly.

It is an object of the present invention to provide an improved manually shifted transaxle having a wider gear ratio range in a compact assembly.

It is a further object of the present invention to provide a transaxle having a reverse gear in mesh with an intermediate gear which is in mesh with a companion gear on a counter shaft, yet which is easy to assemble due to an improved bearing arrangement for such a reverse intermediate gear.

Additional objects and advantages of the present invention will become apparent from the following description.

BRIEF DESCRIPTION OF THE DRAWINGS

FIG. 1 is a cross-sectional view of a transaxle in accordance with the present invention as viewed from above with the upper housing cover removed;

FIG. 2 is a cross-sectional view of the transaxle of FIG. 1 taken along section line 2—2 of FIG. 1 and viewed in the direction of the arrows, particularly showing the arrangement and support of the reverse intermediate gear;

FIG. 3 is a cross-sectional view of the transaxle of FIG. 1 taken along section line 3—3 of FIG. 1 and viewed in the direction of the arrows, particularly showing the transmission brake structure;

FIG. 4 is and end view partially in section of the transaxle of FIG. 1, particularly showing the input shaft and input pinion gear;

FIG. 5 is an axial end view of a typical speed change gear of the transaxle of FIG. 1, particularly showing the keyways for receiving the shift key of the gear shift mechanism;

FIG. 6 is an axial end view of the neutral spacer of the transaxle of FIG. 1, particularly showing the annular channel in which the shift key is received when the transaxle is in neutral;

FIG. 7 is an enlarged fragmentary view of the transaxle of FIG. 1, particularly showing the neutral spacer; and FIG. 8 is an axial end view of the bevel gear of the transaxle of FIG. 1, particularly showing the keyways for receiving the shift key of the gear shift mechanism.

DESCRIPTION OF THE PREFERRED EMBODIMENT

Referring to the figures, there is illustrated a transaxle in accordance with the present invention. The transaxle includes a lower cover 12 made of die-cast aluminum alloy and having a planar horizontal upper mating surface 14. A corresponding upper cover 16 has a planar horizontal lower mating surface 18 in engagement with mating surface 14 with the interface therebetween sealed by a gasket (not shown). Lower cover 12 and upper cover 16 are connected together by a plurality of bolts 20 received in a corresponding plurality of mating bolt holes 22 in the respective covers 12 and 16, so as to form an enclosed housing for the transaxle mechanism.

A vertical input shaft 24 (see FIG. 4) is journalled within a cylindrical bore 26 of an elongated boss 28 on the top of upper cover 16 by needle bearings 30. Received on and splined to the bottom end 32 of input shaft 24 is a bevel pinion gear 33 which is retained on shaft 24 by a retaining ring 34, and which bears against a thrust race 36 between itself and case 16. Another retaining ring 38 and a washer seal 40 on external portion 42 of shaft 24 retain the described input shaft and bevel gear on case 16.

A shift shaft 44 and a counter shaft 46 lying parallel to one another are journalled at each end in semi-cylindrical pillow block bearings in each cover half 12 and 16, respectively, which pillow block bearings mate at the interface of surfaces 14 and 18 to form a full cylindrical bearing. Five companion spur gears 48, 50, 52, 54 and 56 are keyed side-by-side on counter shaft 46 for rotation in unison therewith. Five forward speed change spur gears 58, 60, 62, 64 and 66 are journalled for free rotation on shift shaft 44 and are in constant running mesh with companion gears 48, 50, 52, 54 and 56, respectively. In addition, a reverse speed gear 68 is journalled for free rotation on shift shaft 44 and is in constant running mesh with an intermediate spur gear 70 which is in turn in constant running mesh with spur gear 48 of counter shaft 46. In the embodiment illustrated herein, spur gear 48 is of such a width as to permit it to be in constant running mesh with intermediate gear 70 and speed change gear 58 simultaneously. Alternately, spur gear 48 could be constructed as separate side-by-side gears each being in constant running mesh with one of intermediate gear 70 and speed change gear 58.

Formed integrally with speed change spur gear 66 is a drive bevel gear 72 disposed between spur gear 66 and next adjacent spur gear 64. Spur gear 66 is journalled for free rotation on a shaft portion 74 of shift shaft 44 having a reduced diameter relative to that shaft portion 76 on which spur gears 58, 60, 62, 64 and 68 and bevel gear 72 are journalled. This reduction in diameter of shift shaft 44 in the area on which spur gear 66 is journalled permits the tooth diameter of spur gear 66 to be reduced below what would otherwise be possible, thereby permitting a wider speed change ratio for the transaxle to be obtained. Power input to the transaxle is via vertical input shaft 42 whose bevel pinion gear 33 is engaged in constant running mesh with bevel gear 72.

Each of forward speed change gears 58, 60, 62, 64, and 66/72, as well as reverse gear 68, is selectively coupled one at a time to shift shaft 44 to obtain the desired gear ratio or drive direction. The coupling is accomplished by a pair of axially movable shift keys 78 and 80, each disposed in respective diametrically opposed longitudinal channels 82 and 84 in the surface of larger diameter portion 76 of shift shaft 44. Each key 78 and 80 is fixed at its root end to a shift collar 86 which is axially slidable on portion 76 of shift shaft 44. Collar 86 has a peripheral annular groove 88 in which is received a pin 90 connected to a shift fork 92 which is pivotable through an angle lying in the plane of shift shaft 44 via shift input shaft 94 attached thereto. Shift fork 92, pin 90 and annular groove 88 permit collar 86, and hence keys 78 and 80, to be shifted axially while shift shaft 44 and keys 78 and 80 are at the same time rotating. Each of the gears journalled on shift shaft 44 has on its inner circumference four circumferentially spaced radially oriented keyways or slots 96 into two of which the heads 98 of keys 78 and 80 are received to couple the selected speed change gear to shift shaft 44. Keys 78 and 80 have flexible spring shafts 100 which spring bias key heads 98 radially outward so as to urge the heads 98 into keyways 96 when aligned therewith. Between each adjacent gear in shift shaft 44 are annular washers 102 which separate adjacent keyways and which, in cooperation with tapered faces 104 and 106 of key head 98, force key head 98 out of each keyway with which it is engaged upon axial movement of the key. Consequently, as keys 78 and 80 are moved axially by shift collar 86, the key heads 98 successively engage and disengage the keyways 96 of adjacent gears, thereby coupling each gear to shift shaft 44 sequentially one at a time.

Power output from shift shaft 44 is through spur gear 108 which is splined to shaft 44 for rotation therewith. Gear 108 is in constant running mesh with ring gear 110 of differential 112. Ring gear 110 carries a shaft 114 oriented transverse to output drive shafts 116 and 118. Journalled for free rotation on transverse shaft 114 are bevel gears 120 and 122, each of which is in constant running mesh with bevel gears 124 and 126. Bevel gear 124 is keyed to output drive shaft 116 and bevel gear 126 is keyed to output drive shaft 118. Shafts 116 and 118 are supported for rotation in cover halves 12 and 16 by bearings 117 and 119.

Power transmission from input shaft 42 to output drive shafts 116 and 118 is as follows: Vertical input shaft 42 drives bevel pinion gear 33 which meshes with and drives bevel gear 72. Fifth gear is provided by coupling bevel gear 72 directly to shift shaft 44 by moving shift keys 78 and 80 axially until key heads 98 engage keyways 96 of bevel gear 72. In this configuration power transmission bypasses speed change spur gears 58, 60, 62, 64, 66 and 68, and companion spur gears 48, 50, 52, 54 and 58. Nevertheless, counter shaft 46 and its companion spur gears will be set in motion by spur gear 66 which is integral with bevel gear 72, and the speed change and reverse gears of shift shaft 44 and reverse intermediate gear 70 will likewise be set in motion by the companion spur gears of counter shaft 46 with which they are in constant running mesh, although the gears on shift shaft 44 merely journal freely without participating in the transmission of power. Further transmission of power from shift shaft 44 to output drive shafts 116 and 118 occurs through spur gear 108 and differential 112 in conventional fashion.

The fourth forward gear is provided by coupling speed change gear 64 to shift shaft 44 via shift keys 78 and 80. In this configuration, power is transmitted from bevel gear 72 via integral spur gear 66 to spur gear 56 of counter shaft 46, thereby driving spur gear 54 which in turn drives speed change gear 64 and shift shaft 44 to which it is coupled. Further transmission of power to output drive shafts 116 and 118 is the same as described above with respect to the first forward gear.

Third, second and first forward gears are provided by coupling speed change gears 62, 60 and 58, respectively, to shift shaft 44 which results in a power transmission pathway similar to that described for the fourth forward gear, with spur gear 56 and counter shaft 46 being driven by bevel gear 72/spur gear 66 in each case, and spur gears 52, 50 and 48, respectively, driving the corresponding speed change gear which is coupled to shift shaft 44 by keys 78 and 80.

Reverse gear is engaged by coupling shift keys 78 and 80 to reverse gear 68, which results in a power transmission pathway similar to that for the first forward gear. Spur gear 48 of counter shaft 46, which serves to transmit power to the first forward speed change gear 5, also serves to transmit power to reverse gear 68 via reverse intermediate gear 70. Intermediate gear 70 is disposed in constant running mesh with both spur gear 48 and reverse gear 68 and serves a reversal of rotation direction so that shift shaft 44 and counter shaft 46 rotate in the same direction relative to one another. In the forward gears, shift shaft 44 and counter shaft 46 normally rotate in opposite directions relative to one another.

Referring in particular to FIG. 2, there is illustrated the detail of the bearing support structure for reverse intermediate gear 70. Intermediate gear 70 is mounted on a stub shaft 128 which is received on each side of gear 70 in a half-cylindrical bearing pocket 130 cast integrally with upper cover 16. FIG. 2 is rotated 90 degrees from the actual in-use orientation in which pocket 130 constitutes the upper bearing for stub shaft 128. Pocket 130 supports stub shaft 128 on one circumferential half only and is open in a direction toward a line extending through the axes of rotation of gears 48 and 68. No lower bearing support is provided for stub shaft 128, inasmuch as spur gear 48 and reverse speed change gear 68, which are located below intermediate gear 70, serve to support gear 70 from below. In normal operation of the transaxle in which power is being transmitted from spur gear 48 to reverse gear 68 with spur gear 48 rotating counterclockwise as viewed in FIG. 2, the forces acting on intermediate gear 70 are generally upward. Consequently, the upper half-bearing pocket 130 provides adequate bearing support in opposition to these forces. Only in the situation where the direction of power transfer is reversed, i.e., during use of engine braking, do the forces tend to urge gear 70 downward away from pocket 130. In the latter situation, gear 70 is supported in large part by the bearing of its teeth on the teeth of gears 48 and 68.

Referring in particular to FIG. 7, there is illustrated an enlarged detail view of FIG. 1 in the vicinity of reverse speed change gear 68 and fifth speed change gear 58. In particular, neutral spacer 132 is shown in cross-section. Neutral spacer 132 is constructed of a stamped sheet steel annular ring which after stamping is case hardened by carbonizing heat treatment. Spacer 132 has a substantially flat bottom wall 134, a radially inwardly extending end wall 136, and a radially outwardly extending opposite end wall 138. This configuration permits the formation of spacer 132 by a single stamping action at relatively low cost compared to a cast and machined part. Spacer 132 is disposed between adjacent gears 68 and 58 and provides an annular channel 140 located similarly to keyways 96 of the adjacent gears and is of similar radial depth. Channel 140 is also defined in part by washer 102 received in an annular recess 142 in the side of gear 68 facing spacer 132. Washer 102 engages end wall 138 of spacer 132 and together therewith defines one sidewall of channel 140. Alternately, neutral spacer 132 and washer 102 can be inverted, keeping the same relative orientation with respect to each other, but with washer 102 lying against gear 58 and with end wall 136 of spacer 132 being received in annular recess 142. Unlike the keyways 96, which consist of discrete and separate radial slots in each gear, channel 140 is annular and of even depth completely around its circumference. Consequently, when key heads 98 are disposed within channel 140 formed by spacer 132, a "neutral gear" is thereby effected since the key heads 98 freely slide around channel 140 without causing any transmission of power.

With particular reference to FIGS. 1 and 3, there is illustrated a brake assembly 144 which serves to provide braking action to transaxle 10 and halt the rotation of its internal gearing. Brake assembly 144 includes a housing 146 formed integrally with lower cover 12 and partially surrounding brake disc 148 which is splined to an extension 150 of shift shaft 44 for rotation therewith. As shown in FIG. 3, disposed on either side of brake disc 148 is a pair friction pucks 152 and 154 on one of which a sliding pin 156 bears through an intermediate flat plate. A brake lever 158 is mounted for pivotal rotation about pivot 160 and includes a cam surface 162 which engages sliding pin 156 and is so shaped as to cause pin 156 to exert pressure on puck 154 as lever 158 is rotated. A slight end play permits brake disc 148 to likewise exert pressure on puck 152 such that brake disc 148 is in effect squeezed between friction pucks 152 and 154 upon actuation of lever 158. Rotation of brake disc 148 is retarded thereby and hence shift shaft 44 and ultimately output drive shafts 116 and 118 are likewise retarded.

While the present invention has been particularly described in the context of a preferred embodiment, it will be understood that the invention is not limited thereby. Therefore, it is intended that the scope of the invention include any variations, uses or adaptations of the invention following the general principles thereof and including such departures from the disclosed embodiment as come within known or customary practice in the art to which the invention pertains and which fall within the appended claims or the equivalents thereof.

What is claimed is:

1. A transaxle comprising:
   a housing;
   a shift shaft rotatably mounted in said housing, said shift shaft having a first portion and a second portion wherein said first portion is of greater diameter than said second portion, said shift shaft having an output spur gear affixed to and rotatable with said shift shaft;
   a plurality of adjacent speed change spur gears journalled for free rotation on the first portion of said shift shaft;
   a drive gear integrally conjoined with a speed change gear, said drive gear being journalled for free rotation at least in part on the first portion of said shift shaft and said integrally conjoined speed change gear being journalled for free rotation on the second portion of said shift shaft, such that said drive gear is disposed axially intermediate said integrally conjoined speed change gear and said plurality of adjacent speed change spur gears;
   shift means rotatable with said shift shaft and axially movable on the first portion of said shift shaft for selectively coupling each of said plurality of speed change spur gears and said drive gear one at a time to said shift shaft to effect rotation in unison therewith;
   a counter shaft rotatably mounted in said housing parallel to said shift shaft;
   a plurality of companion spur gears affixed to and rotatable in unison with said counter shaft, each of said companion spur gears being in constant running mesh with at least one of said plurality of adjacent speed change gears and said integrally conjoined speed change gear;
   a differential gear assembly mounted in said housing and being in constant running mesh with the output spur gear of said shift shaft; and
   a pair of output drive shafts rotatably mounted in said housing and driven by said differential gear assembly.

2. The transaxle of claim 1, and further including: a reverse speed change gear journalled for free rotation on the first portion of said shift shaft, said shift means also selectively coupling said reverse speed change gear in like manner as said plurality of speed change gears and said drive gear; and
   a reverse intermediate gear rotatably mounted in said housing and being in constant running mesh with said reverse speed change gear and one of said plurality of companion spur gears.

3. The transaxle of claim 1, in which said shift means includes a shift key axially slidable in a longitudinal channel in the first portion of said shift shaft, said shift key being spring biased radially outward, and in which each of said plurality of adjacent speed change gears and said drive gear includes at least one radially oriented keyway adjacent said first portion of said shift shaft configured to receive said shift key therein when aligned therewith.

4. The transaxle of claim 2, in which said shift means includes a shift key axially slidable in a longitudinal channel in the first portion of said shift shaft, said shift key being spring biased radially outward, and in which each of said plurality of adjacent speed change gears and said drive gear includes at least one radially oriented keyway adjacent said first portion of said shift shaft configured to receive said shift key therein when aligned therewith.

5. The transaxle of claim 3, wherein said drive gear is a bevel gear and said at least one radially oriented keyway of said bevel gear underlies in a radially inward direction only the bevel gear while said integrally conjoined speed change gear is free of any underlying keyway.

6. The transaxle of claim 4, wherein said drive gear is a bevel gear and in which said at least one radially oriented keyway of said bevel gear underlies in a radially inward direction only the bevel gear while said integrally conjoined speed change spur gear is free of any underlying keyway.

7. The transaxle of claim 6, and further including a plurality of annular washers disposed between adjacent speed change gears and serving to separate adjacent keyways.

8. A transaxle comprising:
   a housing;
   a shift shaft rotatably mounted in said housing, said shift shaft having a first portion and a second portion wherein said first portion is of greater diameter than said second portion, said shift shaft having an output spur gear affixed to and rotatable with said shift shaft;
   a plurality of adjacent speed change spur gears and a reverse speed change spur gear journalled for free rotation on the first portion of said shift shaft; a neutral spacer disposed about the first portion of said shift shaft and intermediate said reverse speed change spur gear and said plurality of adjacent speed change spur gears, said neutral spacer defining at least in part an annular channel opening radially inward toward said shift shaft;

a bevel gear integrally conjoined with a speed change spur gear, said bevel gear being journalled for free rotation at least in part on the first portion of said shift shaft and said integrally conjoined speed change gear being journalled for free rotation on the second portion of said shift shaft, such that said bevel gear is disposed axially intermediate said integrally conjoined speed change gear and said plurality of adjacent speed change spur gears;

shift means rotatable with said shift shaft and axially movable on the first portion of said shift shaft for selectively coupling each of said plurality of speed change spur gears, said reverse speed change gear, and said bevel gear one at a time to said shift shaft to effect rotation in unison therewith, said shift means including a shift key axially slidable in a longitudinal channel in the first portion of said shift shaft, said shift key being spring biased radially outward, and in which each of said plurality of adjacent speed change gears and said bevel gear includes at least one radially oriented keyway adjacent said first portion of said shift shaft configured to receive said shift key therein when aligned therewith, the annular channel of said neutral spacer being configured to receive said shift key therein when aligned therewith without effecting coupling to said shift shaft;

a counter shaft rotatably mounted in said housing parallel to said shift shaft; a plurality of companion spur gears affixed to and rotatable in unison with said counter shaft each of said companion spur gears being driving interconnected with at least one of said plurality of adjacent speed change gears and said integrally conjoined speed change gear;

a differential gear assembly mounted in said housing and being in constant running mesh with the output spur gear of said shift shaft; and a pair of output drive shafts rotatably mounted in said housing and driven by said differential gear assembly.

9. The transaxle of claim 8, in which said neutral spacer is constructed of stamped sheet metal and configured as an annular ring having a flat bottom wall, a radially inwardly extending end wall, and a radially outwardly extending opposite end wall.

10. The transaxle of claim 8, and further including a reverse intermediate gear rotatably mounted in said housing and being in constant running mesh with said reverse speed change gear and one of said plurality of companion spur gears.

11. The transaxle of claim 10, and further including a plurality of annular washers disposed between adjacent speed change gears and serving to separate adjacent keyways.

12. The transaxle of claim 11, in which one of said plurality of annular washers engages the radially outwardly extending opposite end wall of said neutral spacer and defines at least in part the annular channel.

13. The transaxle of claim 12, and further including a reverse intermediate gear rotatably mounted in said housing and being in constant running mesh with said reverse speed change gear and one of said plurality of companion spur gears.

14. A transaxle comprising:

a housing;

a shift shaft rotatably mounted in said housing, said shift shaft having an output spur gear affixed to and rotatable with said shift shaft;

a plurality of adjacent speed change spur gears and a reverse speed change spur gear journalled for free rotation on the first portion of said shift shaft;

shift means rotatable with said shift shaft and axially movable on said shift shaft for selectively coupling each of said plurality of speed change spur gears and said reverse speed change gear one at a time to said shift shaft to effect rotation in unison therewith;

a counter shaft rotatably mounted in said housing parallel to said shift shaft;

input means for driving said counter shaft;

a plurality of companion spur gears affixed to and rotatable in unison with said counter shaft, each of said companion spur gears being drivingly connected with at least one of said plurality of adjacent speed change gears and said integrally conjoined speed change gear;

a reverse intermediate gear rotatably mounted on a stub shaft in said housing and being in constant running mesh with said reverse speed change gear and one of said plurality of companion spur gears, the stub shaft of said reverse intermediate gear being supported on one circumferential half only by a half-bearing pocket integral with said housing;

a differential gear assembly mounted in said housing and being in constant running mesh with the output spur gear of said shift shaft; and a pair of output drive shafts rotatably mounted in said housing and driven by said differential gear assembly.

15. The transaxle of claim 14, in which the half-bearing pocket is open in a direction toward a line extending through the axes of rotation of said reverse speed change gear and said one of said plurality of companion spur gears.

16. The transaxle of claim 15, in which said reverse speed change gear, said reverse intermediate gear and said one of said plurality of companion spur gears with which said reverse intermediate gear is in mesh are spaced relative to one another such that said reverse intermediate gear is restrained from escaping in the open direction of said half-bearing pocket by said reverse speed change gear and said one of said plurality of companion spur gears.

* * * * *

UNITED STATES PATENT AND TRADEMARK OFFICE
CERTIFICATE OF CORRECTION

PATENT NO.   : 4,966,574

DATED        : October 30, 1990

INVENTOR(S)  : Roland L. von Kaler et al

It is certified that error appears in the above-identified patent and that said Letters Patent is hereby corrected as shown below:

Column 6, line 5 delete "5" and substitute therefor --58--.

Column 6, line 48, delete "carbonizing" and substitute therefor --carburizing.

Claim 8, column 9, line 34, delete "driving" and substitute therefor --drivingly--.

Claim 9, column 9, line 45, delete "flat".

Signed and Sealed this

Twenty-first Day of April, 1992

Attest:

HARRY F. MANBECK, JR.

*Attesting Officer*     *Commissioner of Patents and Trademarks*